US008777705B2

(12) United States Patent
Nomura et al.

(10) Patent No.: US 8,777,705 B2
(45) Date of Patent: Jul. 15, 2014

(54) SLIDING DOOR DEVICE

(75) Inventors: Daisuke Nomura, Sakuragawa (JP);
Naoki Higa, Utsunomiya (JP)

(73) Assignee: Keihin Corporation (JP)

( * ) Notice: Subject to any disclaimer, the term of this patent is extended or adjusted under 35 U.S.C. 154(b) by 289 days.

(21) Appl. No.: 13/028,307

(22) Filed: Feb. 16, 2011

(65) Prior Publication Data
US 2011/0197512 A1 Aug. 18, 2011

(30) Foreign Application Priority Data

Feb. 17, 2010 (JP) ................................. 2010-032672

(51) Int. Cl.
*B60H 1/02* (2006.01)
*B60H 1/22* (2006.01)
(52) U.S. Cl.
USPC ............................................ 454/160; 454/69
(58) Field of Classification Search
USPC ................................................... 454/160, 69
See application file for complete search history.

(56) References Cited

U.S. PATENT DOCUMENTS

| | | | | |
|---|---|---|---|---|
| 4,382,725 | A * | 5/1983 | Dugge | 406/131 |
| 5,476,418 | A * | 12/1995 | Loup | 454/121 |
| 5,499,947 | A * | 3/1996 | Tauber | 454/69 |
| 5,779,535 | A * | 7/1998 | Bendell et al. | 454/121 |
| 6,019,163 | A * | 2/2000 | Saida et al. | 165/42 |
| 6,048,263 | A * | 4/2000 | Uchida et al. | 454/121 |
| 6,193,600 | B1 * | 2/2001 | Ito et al. | 454/69 |
| 6,224,480 | B1 * | 5/2001 | Le et al. | 454/160 |
| 6,305,462 | B1 * | 10/2001 | Tsurushima et al. | 165/43 |
| 6,347,988 | B1 * | 2/2002 | Kurokawa et al. | 454/121 |
| 6,431,257 | B1 * | 8/2002 | Sano et al. | 165/42 |
| 6,450,246 | B1 * | 9/2002 | Kurokawa et al. | 165/42 |
| 6,463,998 | B1 * | 10/2002 | Shindo | 165/204 |
| 6,536,474 | B2 * | 3/2003 | Akahane | 137/625.44 |
| 6,609,563 | B1 * | 8/2003 | Tsurushima et al. | 165/204 |
| 6,814,137 | B2 * | 11/2004 | Tsurushima et al. | 165/202 |
| 6,814,138 | B2 * | 11/2004 | Tsurushima et al. | 165/202 |
| 6,881,140 | B2 * | 4/2005 | Le | 454/156 |
| 7,090,575 | B2 * | 8/2006 | Ito et al. | 454/156 |
| 7,140,392 | B2 * | 11/2006 | Blomquist et al. | 137/637.3 |
| 7,520,803 | B2 * | 4/2009 | Ito et al. | 454/121 |

(Continued)

FOREIGN PATENT DOCUMENTS

| | | |
|---|---|---|
| CN | 1157782 A | 8/1997 |
| CN | 101086380 A | 12/2007 |

(Continued)

OTHER PUBLICATIONS

Extended European Search Report for European Application No. 11001272.1-1268 dated Jun. 14, 2011.

(Continued)

*Primary Examiner* — Kang Hu
*Assistant Examiner* — Jonathan Cotov
(74) *Attorney, Agent, or Firm* — Cantor Colburn LLP

(57) ABSTRACT

A sliding door device includes a frame case that includes an opening through which an air flow passes, a slide door that is moved relative to the opening to adjust an aperture ratio of the opening, a shaft that is disposed at an upstream side of the slide door when viewed along the flowing direction of the air flow, and moves the slide door, and a windbreak member that blocks a gap between the shaft and the slide door.

2 Claims, 4 Drawing Sheets

(56) References Cited

U.S. PATENT DOCUMENTS

| | | | |
|---|---|---|---|
| 7,540,321 B2* | 6/2009 | Simmet et al. | 165/203 |
| 7,726,391 B2* | 6/2010 | Seo et al. | 165/202 |
| 7,775,451 B2* | 8/2010 | Leoni | 236/49.5 |
| 7,794,314 B2* | 9/2010 | Sekiya et al. | 454/334 |
| 8,302,674 B2* | 11/2012 | Kim et al. | 165/202 |
| 2001/0014582 A1* | 8/2001 | Ito | 454/69 |
| 2002/0000307 A1* | 1/2002 | Denk et al. | 165/42 |
| 2002/0004368 A1* | 1/2002 | Denk et al. | 454/160 |
| 2002/0009968 A1 | 1/2002 | Tsurushima et al. | |
| 2003/0054751 A1 | 3/2003 | Parekh et al. | |
| 2005/0077038 A1* | 4/2005 | Perry et al. | 165/202 |
| 2006/0144582 A1* | 7/2006 | Sekiya et al. | 165/202 |
| 2007/0281599 A1 | 12/2007 | Mori | |
| 2007/0293135 A1* | 12/2007 | Hori et al. | 454/121 |
| 2008/0108293 A1* | 5/2008 | Haupt et al. | 454/156 |
| 2008/0200110 A1* | 8/2008 | Ghosh et al. | 454/160 |
| 2010/0120348 A1* | 5/2010 | Tanaka et al. | 454/159 |
| 2010/0224253 A1* | 9/2010 | Azar et al. | 137/1 |
| 2011/0059685 A1* | 3/2011 | Ido | 454/69 |

FOREIGN PATENT DOCUMENTS

| | | | | |
|---|---|---|---|---|
| CN | 201163068 Y | 12/2008 | | |
| EP | 1621375 A2 | 2/2006 | | |
| EP | 1634736 B1 | 7/2009 | | |
| EP | 2135757 A1 | 12/2009 | | |
| JP | 2005-349942 A | 12/2005 | | |
| JP | 2006-103664 A | 4/2006 | | |
| JP | WO2008130038 A1 * | 4/2008 | | B60H 1/00 |
| JP | 2009-227129 A | 10/2009 | | |

OTHER PUBLICATIONS

Notice of Reasons for Rejection for Japanese Patent Application No. 2010-032672; Date of Mailing: Aug. 20, 2013, with English Translation.

Chinese Office Action for Application No. 201110038829.7 dated Jan. 6, 2014, with English Translation.

* cited by examiner

SLIDING DOOR DEVICE

BACKGROUND OF THE INVENTION

1. Field of the Invention

The present invention relates to a sliding door device. This application claims priority from Japanese Patent Application No. 2010-032672, filed Feb. 17, 2010, the content of which is incorporated herein by reference.

2. Description of Related Art

For example, in an air conditioner for a vehicle that adjusts the air temperature in a vehicle, an air flow cooled by an evaporator is divided into an opening for a heating flow passage and an opening for ventilation. The opening for heating flow passage is an opening for passing an air flow through a heater core. In addition, the opening for ventilation is an opening for supplying the air flow ejected from the evaporator without passing through the heater core. In the air conditioner for the vehicle, the air flow is divided into the opening for heating flow passage and the opening for ventilation, whereby the temperature of the conditioned air is adjusted.

The opening for heating flow passage and the opening for ventilation are provided side by side. In the air conditioner for the vehicle, a device having, for example, a slide door is provided in order to adjust an aperture ratio of these openings.

In the sliding door device, a movement of the slide door is generally performed by a rack and pinion scheme.

Hereinafter, more detailed descriptions of a configuration and operations of the slide door will be made. In Japanese Unexamined Patent Application, First Publication No. 2009-227129, when viewed along the flowing direction of an air flow, a shaft is installed at an upstream side of the slide door. In addition, a pinion gear is fixed to the shaft. A rack gear is installed in the slide door, and engaged with the pinion gear. Due to this configuration, a rotation movement of the pinion gear is transmitted to the rack gear by rotating the pinion gear. The slide door is moved by the transmission of the rotation movement to the rack gear.

However, in a conventional sliding door device, a gap between the shaft and the slide door is formed. Due to this, a part of the air flow is dragged onto the shaft, or changes its direction with respect to the slide door, thereby passing through the gap.

When the air flow passes through the gap between the shaft and the slide door, the air flow conflicts with an air flow of a main flow passing through the opening. Due to this, a turbulent flow is generated and thus, noise occurs.

SUMMARY OF THE INVENTION

Some aspects of the invention provide a sliding door device that controls occurrence of noise.

[1] According to an aspect of the invention, there is provided a sliding door device, including: a frame case that includes an opening through which an air flow passes; a slide door that is moved relative to the opening to adjust an aperture ratio of the opening; a shaft that is disposed at an upstream side of the slide door when viewed along the flowing direction of the air flow, and moves the slide door; and a windbreak member that blocks a gap between the shaft and the slide door.

[2] In the sliding door device described in [1], the windbreak member may be erected toward a radial direction of the shaft from a peripheral surface of the shaft.

[3] The sliding door device described in [2] may further include: a pinion gear that is fixed to the shaft; and a rack gear that is installed in the slide door to be engaged with the pinion gear. Here, a height dimension in the radial direction of the windbreak member may be greater than a height dimension in a radial direction of a tooth bottom of the pinion gear, and smaller than a height dimension in a radial direction of a tooth top of the pinion gear.

[4] The sliding door device described in any one of [1] to [3] may further include a supporting member that supports the windbreak member.

EFFECTS OF THE INVENTION

The sliding door device according to the aspect of [1] may block a gap between the slide door and the shaft using the windbreak member, whereby an air flow may be prevented from passing through the gap between the slide door and the shaft. Due to this, it is possible to suppress the occurrence of a turbulent flow due to conflict between an air flow passing through the opening and the air flow passing through the gap between the shaft and the slide door. Thus, the occurrence of abnormal noise such as wind noise may be suppressed, thereby suppressing the occurrence of noise.

In addition, in the case of [2], the windbreak member is fixed to the shaft, whereby it is possible to integrate the windbreak member and the shaft using a plastic substance such as a resin substance.

In addition, in the case of [3], the height dimension of the windbreak member is greater than the height dimension in the radial direction of the tooth bottom of the pinion gear, and is smaller than the height dimension in the radial direction of the tooth top of the pinion gear, whereby the windbreak member may be in close contact with the slide door when the shaft is rotated. Thus, the rotation of the pinion gear may maximally block the gap between the shaft and the slide door without being hindered by the windbreak member. As a result, it is possible to obtain a smooth sliding operation of the slide door without hindrance by the air flow due to the windbreak member.

In addition, in the case of [4], it is possible to prevent curving or breakage of the windbreak member by the support member. Thus, it is possible to more reliably prevent the air flow from passing through the gap between the shaft and the slide door.

DETAILED DESCRIPTION OF THE INVENTION

Figure 1:
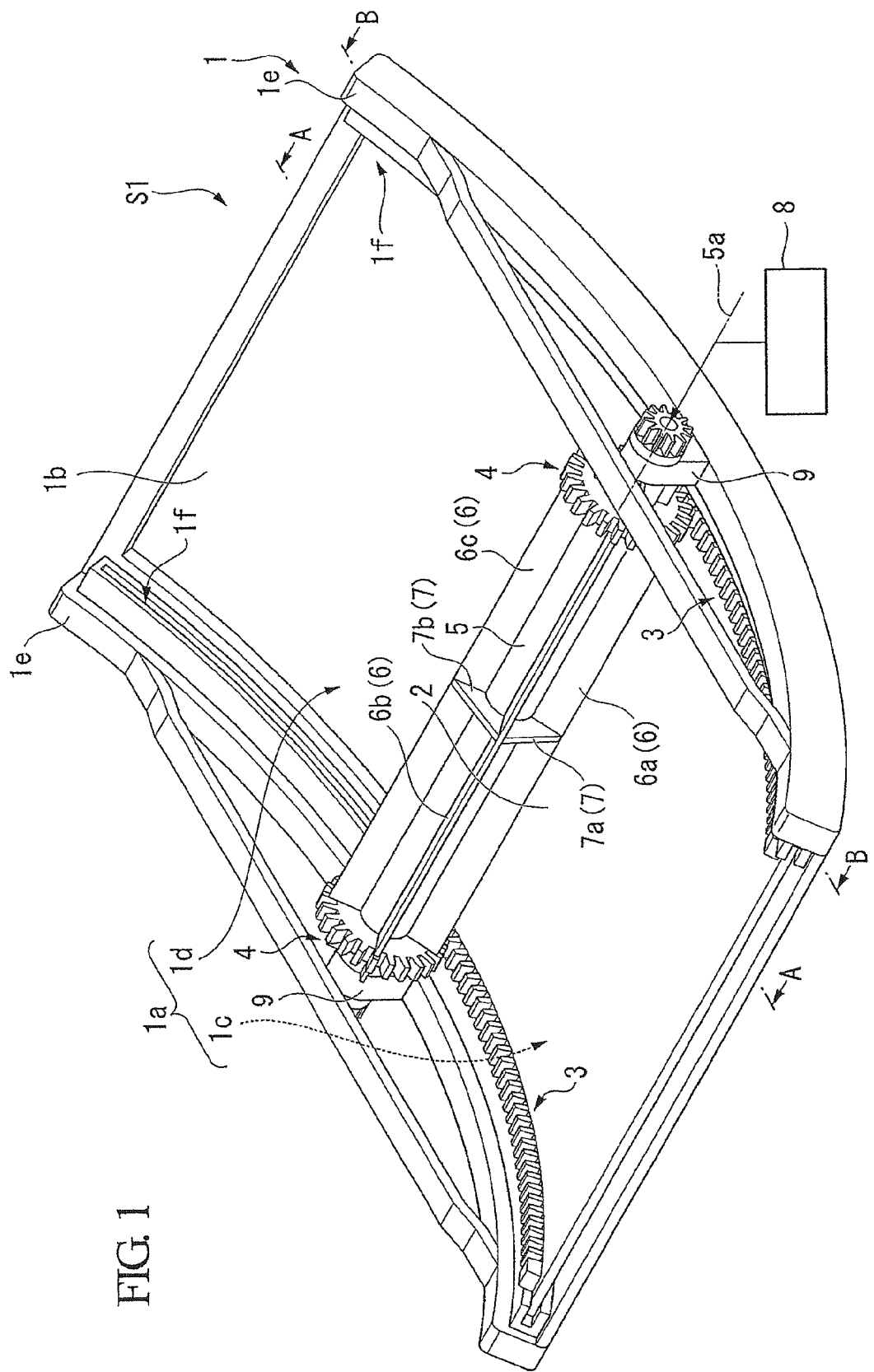
FIG. 1 is a perspective view showing a schematic configuration of a sliding door device according to an embodiment of the present invention.

Hereinafter, a sliding door device according to an embodiment of the present invention will be described with reference to the accompanying drawings. In addition, the scale of each member is suitably changed in order to have a recognizable size in the drawings described below.

In addition, an example in which the sliding door device of the present embodiment of the invention is applied to an air conditioner for a vehicle will be described. However, the invention is not limited thereto, and may be applied to other sliding door devices including a slide door. Specifically, for example, the invention may even be applied to a mode damper for adjusting an aperture ratio of an outlet of the air conditioner for the vehicle, an inside/outside air switching damper for controlling opening and closing for the purpose of inside/outside air switching through a discharge port of a blower, and the like. In addition, the sliding door device including the slide door may be applied to devices other than the air conditioner for the vehicle.

FIG. 1 is a sliding door device S1 according to an embodiment of the present invention. The sliding door device S1 is accommodated in a heater case (not shown) within a heating ventilation air conditioning (HVAC) formed into a unit. The heater case is a case for accommodating a heater core or an evaporator.

The sliding door device S1 adjusts a supply flow rate to a heating flow passage of a cold air supplied from the evaporator in accordance with a set temperature. Due to this, a mixing ratio between a warm air heated in the heating flow passage and the cold air ventilated directly to a mixing unit may be adjusted.

As shown in FIG. 1, the sliding door device S1 according to the present embodiment includes a frame case 1, a slide door 2, a rack gear 3, a pinion gear 4, a shaft 5, a windbreak member 6, a supporting member 7, and a driving device 8.

First, the frame case 1 will be described in detail. The frame case 1 is fixed to the heater case. An opening 1a through which an air flow passes is formed on the frame case 1. Hereinafter, a virtual opening surface formed by the opening 1a is referred to as an opening surface 1b.

Among the openings 1a, an opening communicating with the heating flow passage is used as an opening 1c for the heating flow passage, and an opening through which the air flow ejected from the evaporator is ventilated directly to the mixing unit is used as an opening 1d for ventilation.

In addition, in both sides of the frame case 1, that is, the opening 1c for the heating flow passage and the opening 1d for ventilation, a pair of support walls 1e are erected. In a center of an extending direction of the pair of support walls 1e, a bearing 9 for pivotably supporting both ends of the shaft 5 is respectively provided. In the bearing 9, a through hole is provided through which the shaft 5 passes. Furthermore, when the sliding door device S1 is actually mounted in the air conditioner for a vehicle, the frame case 1 may be configured as a part of the heater case.

In addition, in the frame case 1, a pair of curved guide grooves 1f for movably supporting the slide door 2 are provided. The pair of curved guide grooves 1f are formed as grooves on the pair of support walls 1e. Respective side edges of the slide door 2 are fitted within each of the pair of the guide grooves 1f, so that the slide door 2 is movably supported.

Next, the slide door 2 will be described in detail. The slide door 2 is a curved plate-shaped member. The slide door 2 has a size allowing selective closure of any one of the opening 1c for the heating flow passage and the opening 1d for ventilation. Both side edges of the slide door 2 are slidably fitted on each of the pair of guide grooves 1f. Due to this configuration, the slide door 2 is slidably moved along the guide groove 1f by receiving a force from the rack gear 3 and the pinion gear 4. The slide door 2 is moved relative to the opening 1c for heating flow passage and the opening 1d for ventilation, and thereby an aperture ratio of the openings (the opening 1c for heating flow passage and the opening 1d for ventilation) may be adjusted.

Next, the rack gear 3 will be described in detail.

The rack gear 3 is provided on both side edges of the slide door 2 in such a manner as to extend along a slide direction, as shown in FIG. 1. The rack gear 3 is integrally formed with the slide door 2. The rack gear 3 is engaged with a corresponding pinion gear 4.

Next, the pinion gear 4 will be described in detail.

The pinion gear 4 is respectively fixed on both end portions of the shaft 5, and is integrally rotated by the rotation of the shaft 5. Due to this rotation, the pinion gear 4 functions as a driving gear enabling the rack gear 3 to be slidably moved.

Next, the shaft 5 will be described in detail.

The pinion gear 4 is fixed on both end portions of the shaft 5, and the shaft 5 is rotatably supported by the bearing 9 attached to the support wall 1e. The shaft 5 is rotatable around an axis line 5a of the shaft 5 as a rotation axis. The shaft 5 is disposed at the upstream side from the opening 1c for heating flow passage and the opening 1d for ventilation when viewed along the flow direction of the air flow. The power of a driving device 8 is transmitted to the pinion gear 4, the rack gear 3, and the slide door 2 due to the rotation of the shaft 5, and the slide door 2 is moved relative to the opening 1c for heating flow passage and the opening 1d for ventilation.

Next, the windbreak member 6 will be described in detail.

The windbreak member 6 is a plate member for preventing the air flow from passing through between the shaft 5 and the slide door 2, and is positioned so as to block a gap between the shaft 5 and the slide door 2.

In addition, as an example of the air flow passing through between the shaft 5 and the slide door 2, an air flow that performs a direction change by reaching the surface of the slide door 2 to flow along the surface of the slide door 2, and an air flow dragged onto the shaft 5 are given.

Figure 2:
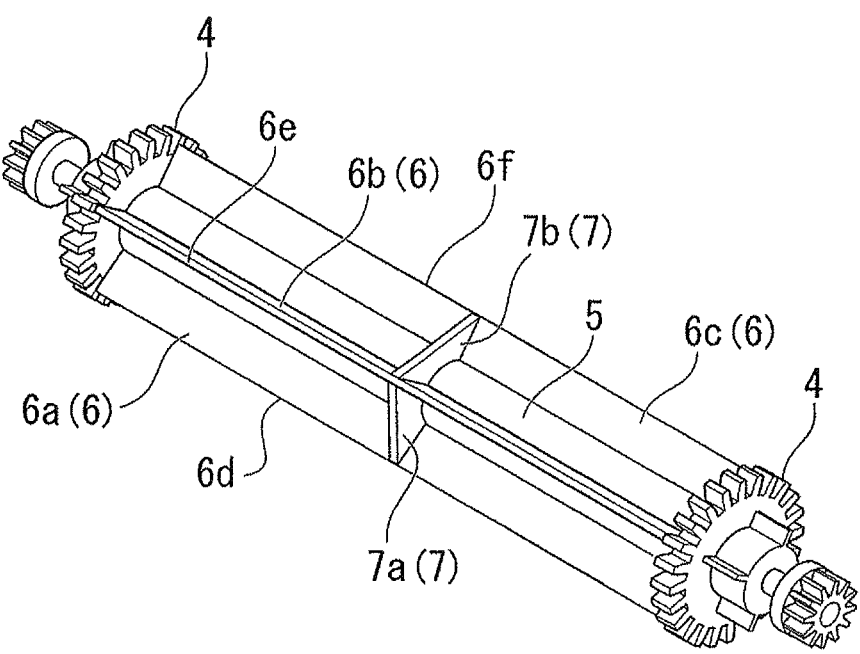
FIG. 2 is a perspective view of a component including a shaft of the sliding door device.
Figure 3:
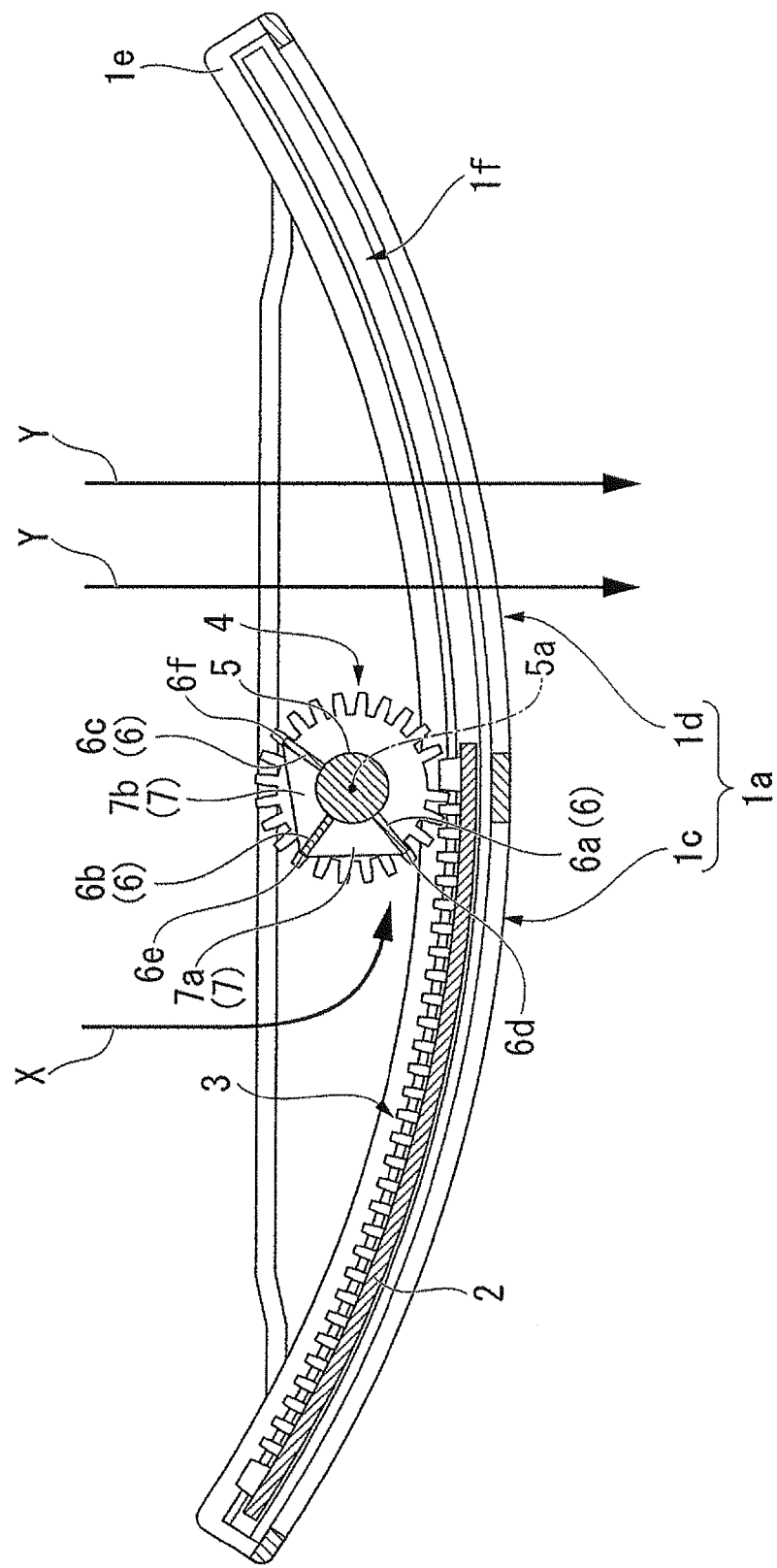
FIG. 3 is a cross-sectional view taken from the A-A line of FIG. 1 in the sliding door device.

Next, a shape and an erected position of the windbreak member 6 will be described in detail with reference to FIGS. 2 and 3. FIG. 2 is a cross-sectional view showing the shaft 5 and the windbreak member 6 included in the sliding door device 51 according to an embodiment of the present invention. In addition, FIG. 3 is a cross-sectional view obtained when the sliding door device S1 is viewed from the A-A line of FIG. 1.

In the slide door S1 according to an embodiment, three pieces of the windbreak members 6 are fixed to an outer circumferential surface of the shaft 5. Each of the windbreak members 6 extends along an extending direction of the shaft 5. In addition, each of the windbreak members 6 is a plate-shaped member erected towards the radial direction of the shaft 5. Due to this configuration, the windbreak member 6 is rotated integrally with the shaft 5 using the axis line 5a as the rotation axis when the shaft 5 is rotated.

So that each distal end 6d, 6e, and 6f of the three pieces of the windbreak members in the sliding door device S1 according to an embodiment approaches the slide door 2 as much as possible when the aperture ratio of the opening 1c for heating flow passage is respectively 10%, 30%, and 60%, a circumferential direction position in the outer circumferential surface of the shaft 5 is determined.

Disposition of each of the windbreak members 6 in the circumferential direction position of the outer circumferential surface of the shaft 5 will be described in detail with reference to FIG. 3.

A first windbreak member 6a, that is, one of the three pieces of the windbreak members 6 is disposed at a position where the distal end 6d approaches the slide door 2 as much as possible, when the slide door 2 is disposed at a position to open the opening 1c for the heating flow passage by 10%.

A second windbreak member 6b is disposed at a position where the distal end 6e approaches the slide door 2 as much as possible, when the slide door 2 is disposed at a position to open the opening is for the heating flow passage by 30%.

A third windbreak member 6c is disposed at a position where the distal end 6f approaches the slide door 2 as much as possible, when the slide door 2 is disposed at a position to open the opening 1c for the heating flow passage by 60%.

Figure 4:
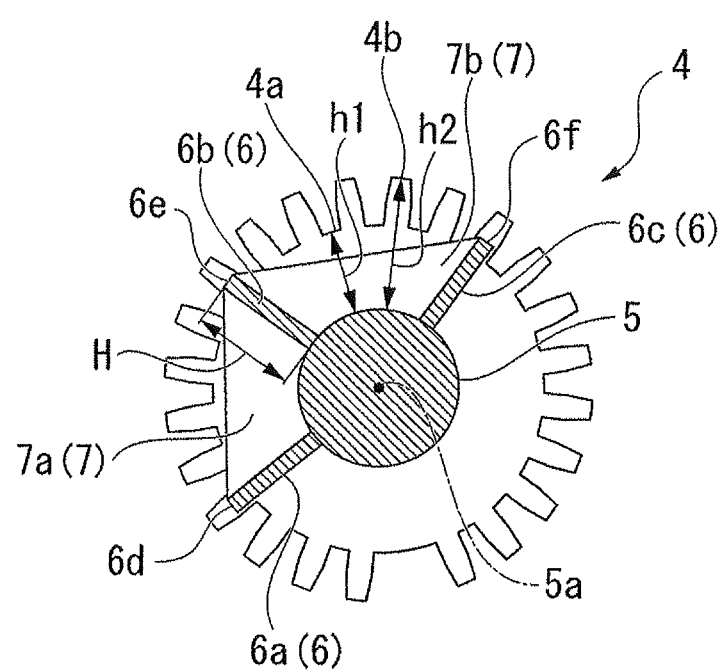
FIG. 4 is an enlarged cross-sectional view showing a shaft of the sliding door device.

In addition, as shown in FIG. 4, a height dimension H of each of the windbreak members 6 in the sliding door device S1 according to an embodiment is preferably greater than a height $h_1$ in a radial direction of a tooth bottom 4a of the pinion gear 4, and smaller than a height $h_2$ in a radial direction of a tooth top 4b of the pinion gear 4.

In addition, the windbreak member 6 is not limited to erection in the radial direction of the shaft 5, and may be erected even in a surface side of the slide door 2 (see below). In this case, the windbreak member 6 is preferably a plate-shaped member extending in the direction of the axis line 5a. In addition, the number and disposition of the windbreak members 6 are not limited only to the above description, and may be appropriately changed depending on conditions.

Next, the supporting member 7 will be described. The supporting member 7 supports the windbreak member 6, and is vertically fixed to the shaft 5 as shown in FIGS. 2 and 3, to connect the windbreak members 6 adjacent to each other.

A more detailed description of the disposition of the support member 7 will be herein made. A supporting member 7a connects the first windbreak member 6a and the second windbreak member 6b, and a supporting member 7b connects the second windbreak member 6b and the third windbreak member 6c.

In addition, as shown in FIG. 2, in the sliding door device S1 according to an embodiment, a single supporting member 7 is disposed in a center in the longitudinal direction of the shaft 5. However, the position and number of the supporting members 7 is not limited to those shown in FIG. 2, and a plurality of supporting members 7 may be disposed in an arbitrary position.

Next, the driving device 8 shown in FIG. 1 will be described. As the driving device 8, for example, a motor may be used; however, other drive sources may be used as long as they are capable of transmitting a power to the shaft 5. The driving device 8 is connected to the shaft 5. The shaft 5 is rotated around the axis line 5a as the rotation axis due to the power transmitted from the driving device 8.

In the sliding door device S1 according to an embodiment having the above described configuration, when the shaft 5 is rotated around the axis line 5a as the rotation axis due to the driving device 8, the pinion gear 4 is also rotated with the rotation of the shaft 5. A rotary motion force of the pinion gear 4 is transmitted to the rack gear 3 to be converted to a force toward the slide direction. The force in the slide direction is applied to the rack gear 3, and thereby the slide door 2 is slidably moved. Thus, the slide door 2 is slidably moved between a position where the slide door 2 completely closes only the opening 1c for the heating flow passage and a position where the slide door 2 completely closes only the opening 1d for ventilation.

In this instance, a rotating direction and a rotating quantity of the pinion gear 4 is controlled by a control device not shown. Due to this, a sliding position of the slide door 2 is controlled. Due to the control of the slide position of the slide door 2, an opening area ratio (aperture ratio) of the opening 1c for the heating flow passage and the opening 1d for ventilation is adjusted. As a result, a mixing ratio of the air flow ejected from the evaporator and an air flow ejected from the heater core is adjusted.

Therefore, a temperature inside the vehicle may be adjusted by the rotating direction and the rotating quantity of the pinion gear 4.

Here, in the slide door S1 according to an embodiment, since the windbreak member 6 is disposed so as to block the gap between the shaft 5 and the slide door 2, the air flow is prevented from passing the gap between the shaft 5 and the slide door 2.

Thus, as shown in FIG. 3, even though the flow direction of a part of the air flow X is changed due to the rotation of the shaft 5 and collision with the slide door 2, the air flow X does not pass the gap between the shaft 5 and the slide door 2 due to the presence of the windbreak member 6. Therefore, the air flow X does not collide with the air flow Y passing the opening 1c for the heating flow passage (or the opening 1d for ventilation). Thus, since generation of turbulence is suppressed, the occurrence of abnormal noise such as wind noise may be suppressed.

In addition, since the windbreak member 6 is fixed to the shaft 5, the windbreak member 6 and the shaft 5 may be integrally molded by a plastic substance such as a resin substance, or the like. In this instance, the windbreak member 6 may be formed into a plate-shape, and thereby an amount of the plastic substance required for formation of the windbreak member 6 may be suppressed to a minimum amount.

In addition, due to the plate-shape of the windbreak member 6, the deformation of surface sink (sink marks) barely occurs in the shaft 5. Thus, the deformation of the shaft 5 may be suppressed.

In addition, as shown in FIG. 4, since the height H of the radial direction of each of the windbreak members 6 is greater than the height $h_1$ in a radial direction of a tooth bottom 4a of the pinion gear 4, and smaller than a height $h_2$ in a radial direction of a tooth top 4b of the pinion gear 4, the windbreak member 6 is not in close contact with the slide door 2 when the shaft 5 is rotated.

Thus, the rotation of the pinion gear 4 may maximally block the gap between the shaft 5 and the slide door 2 without being hindered by the windbreak member 6. Therefore, it is possible to reliably prevent the air flow X from passing the gap between the slide door 2 and the shaft 5. As a result, it is possible to effectively suppress noise when using the sliding door device S1.

In addition, since the supporting member 7 for supporting the windbreak member 6 is provided, it is possible to prevent curving or breakage of the windbreak member 6. Thus, it is possible to reliably prevent the air flow from passing the gap between the shaft 5 and the slide door 2.

In addition, since the side surface of the plate-shaped windbreak member 6 is supported by the supporting member 7, it is possible to prevent the inclination of the windbreak member 6. Thus, it is possible to more reliably prevent a cold air from passing the gap between the shaft 5 and the slide door 2.

In addition, based on an experiment in which the air flow flows in the sliding door device where the windbreak member 6 is not provided was carried out, noise tended to be greater when the aperture ratio of the opening 1c for the heating flow passage of the slide door 2 was 10%, 30%, and 60%. Due to this, in the slide door S1 according to an embodiment, since the windbreak member 6 is disposed such that the distal ends (6d to 6f) approach the slide door 2 as much as possible when the aperture ratio of the opening 1c for the heating flow passage is 10%, 30%, and 60% due to the slide door 2, the generation of the turbulence flow is prevented particularly under a condition in which the turbulence flow is easily generated.

Accordingly, when the aperture ratio of the opening 1c for the heating flow passage is respectively 10%, 30%, and 60%, the cold air barely passes the gap between the shaft 5 and the slide door 2. However, the present invention is not limited only to the aperture ratios, and for example, the windbreak member 6 may be disposed based on the ease of manufacturing of the shaft 5, the windbreak member 6, or the supporting member 7.

In addition, according to the above described embodiment, a configuration in which three pieces of the windbreak members 6 are provided has been described. However, the present invention is not limited thereto, and the number of the windbreak members 6 may be freely provided, as necessary, such as one, two, and four pieces or more.

In this manner, since the windbreak member 6 is disposed in accordance with the aperture ratio of the opening 1*c* for the heating flow passage having a tendency in which noise is increase, it is possible to effectively reduce the noise while minimizing the number of the windbreak members 6. While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, according to the above embodiment, the configuration in which the plate-shaped windbreak member 6 is erected in the shaft 5 has been described.

However, the configuration of the windbreak member 6 according to the present invention is not limited thereto. For example, as the windbreak member 6, a plate-shaped member or a block-shaped member that extends in a direction substantially perpendicular to the movement direction of the slide door 2 may be used, however, the shape and installation position of the windbreak member 6 is not particularly limited as long as the windbreak member 6 can block the gap between the shaft 5 and the slide door 2.

In addition, in the case of the block-shaped windbreak member 6, the supporting member 7 is not necessarily provided. Furthermore, as supporting measures of the windbreak member 6, members other than the supporting member 7 may be used.

What is claimed is:

1. A sliding door device, comprising:
   a frame case that includes an opening through which an air flow passes;
   a slide door that is moved relative to the opening to adjust an aperture ratio of the opening;
   a shaft that is disposed at an upstream side of the slide door when viewed along the flowing direction of the air flow, and moves the slide door;
   a pinion gear that is fixed to the shaft;
   a rack gear that is installed in the slide door to be engaged with the pinion gear; and
   a windbreak member comprising a planar protrusion on the shaft that blocks a gap between the shaft and a face of the slide door;
   wherein the windbreak member extends outward in a radial direction of the shaft from a peripheral surface of the shaft; and
   wherein a height dimension in the radial direction of the windbreak member is greater than a height dimension in the radial direction of a tooth bottom of the pinion gear, and is smaller than a height dimension in the radial direction of a tooth top of the pinion gear so that the windbreak member approaches but does not contact the face of the slide door.

2. The sliding door device according to claim 1, further comprising:
   a supporting member that supports the windbreak member.

* * * * *